United States Patent
Mizumoto et al.

(10) Patent No.: US 10,406,880 B2
(45) Date of Patent: Sep. 10, 2019

(54) REINFORCING STRUCTURE OF SUSPENSION ARM AND METHOD OF MANUFACTURING THE SAME

(71) Applicant: HONDA MOTOR CO., LTD., Tokyo (JP)

(72) Inventors: Akihiko Mizumoto, Saitama (JP); Masaaki Nishi, Saitama (JP); Hisashi Ishimatsu, Saitama (JP); Masashi Furuya, Saitama (JP); Hirokuni Fuchigami, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 72 days.

(21) Appl. No.: 15/714,021

(22) Filed: Sep. 25, 2017

(65) Prior Publication Data

US 2018/0086165 A1    Mar. 29, 2018

(30) Foreign Application Priority Data

Sep. 27, 2016    (JP) .................................. 2016-188397

(51) Int. Cl.
*B60G 7/02* (2006.01)
*B60G 3/20* (2006.01)
*B60G 7/00* (2006.01)

(52) U.S. Cl.
CPC ................ *B60G 7/02* (2013.01); *B60G 3/20* (2013.01); *B60G 7/001* (2013.01); *B60G 2200/18* (2013.01); *B60G 2206/014* (2013.01)

(58) Field of Classification Search
CPC ... F16H 55/18; F16H 1/2836; B60G 21/0555; B60G 2202/42; B60G 2204/419; B60G 2204/4191; B60G 2206/014
See application file for complete search history.

(56) References Cited

U.S. PATENT DOCUMENTS

| | | | |
|---|---|---|---|
| 7,387,307 B2 * | 6/2008 | Tanaka ................... | B60G 3/202 280/124.135 |
| 7,575,244 B2 * | 8/2009 | Howell .................. | B60G 7/001 280/124.134 |
| 8,500,149 B1 * | 8/2013 | Nazarian, Jr. ............ | B60G 3/06 277/635 |

(Continued)

FOREIGN PATENT DOCUMENTS

JP    07-186649    7/1995

*Primary Examiner* — Drew J Brown
(74) *Attorney, Agent, or Firm* — Rankin, Hill & Clark LLP (57) ABSTRACT

An object of the present invention is to provide a reinforcing structure of a suspension arm, in which high rigidity capable of withstanding any input from a road surface or the like can be given to the suspension arm. In a vehicle suspension including a plurality of suspension arms, one ends of which being connected to a vehicle body of a vehicle and the other ends of which being connected to a knuckle, a control arm includes a main body and a pair of attachment portions provided at both ends of the main body. Each of the pair of attachment portions is provided with a substantially cylindrical through-hole for connection to the vehicle body or the knuckle. At least one of the pair of attachment portions is provided with an annular reinforcing member for reinforcing around the through-hole.

10 Claims, 5 Drawing Sheets

(56) References Cited

U.S. PATENT DOCUMENTS

| | | | | |
|---|---|---|---|---|
| 8,783,759 B2* | 7/2014 | Neumann | ............... | B60G 7/001 164/98 |
| 2002/0149146 A1* | 10/2002 | Lefebvre | .................. | B60G 7/02 267/293 |
| 2006/0012095 A1* | 1/2006 | Bjorkgard | ............... | B60G 7/001 269/40 |
| 2009/0295113 A1* | 12/2009 | Inoue | ...................... | B60G 7/001 280/124.134 |
| 2013/0154310 A1* | 6/2013 | Neumann | ............... | B60G 7/001 296/204 |
| 2014/0210177 A1* | 7/2014 | Dicke | .................... | B60G 7/001 280/124.134 |
| 2016/0121677 A1* | 5/2016 | Meier | .................... | B60G 7/005 280/124.134 |
| 2018/0290512 A1* | 10/2018 | Hirano | .................... | B60G 7/001 |
| 2018/0361481 A1* | 12/2018 | Tenhaeff | .................... | B22F 7/08 |

\* cited by examiner

REINFORCING STRUCTURE OF SUSPENSION ARM AND METHOD OF MANUFACTURING THE SAME

CROSS REFERENCE TO RELATED APPLICATIONS

This application claims the foreign priority benefit under Title 35, United States Code, § 119 (a)-(d) of Japanese Patent Application No. 2016-188397, filed on Sep. 27, 2016, the disclosure of which is herein incorporated by reference in its entirety.

TECHNICAL FIELD

The present invention relates to a reinforcing structure of a suspension arm of a vehicle and a method of manufacturing the same.

BACKGROUND ART

In order to keep ride comfort, running stability and steering feeling of the vehicle satisfactory, the vehicle is equipped with a suspension for buffering unevenness of a road surface. As an example of a vehicle suspension, for example, Patent Document 1 discloses a multi-link vehicle suspension including five suspension arms called a trailing arm, a leading arm, an upper arm, a lower arm and a control arm.

CITATION LIST

Patent Literature

[Patent Document 1]
Japanese Patent Application Publication No. H07-186649

SUMMARY OF INVENTION

Technical Problem

The suspension arm according to Patent Document 1 is required to have high rigidity capable of withstanding any input from the road surface or the like in order to keep the ride comfort, running stability and steering feeling of the vehicle satisfactory.

The present invention has been made in view of the above circumstances, and an object of the present invention is to provide a reinforcing structure of the suspension arm, in which high rigidity capable of withstanding any input from the road surface or the like can be given to the suspension arm.

Another object of the present invention is to provide a method of manufacturing a suspension arm having high rigidity capable of withstanding any input from the road surface or the like.

Solution to Problem

In order to solve the above problems, a reinforcing structure of a suspension arm according to a first aspect of the present invention is premised on a vehicle suspension including a plurality of suspension arms, one ends of which being connected to a vehicle body of a vehicle and the other ends of which being connected to a knuckle. At least one of the suspension arms includes a main body and a pair of attachment portions provided at both ends of the main body. Each of the pair of attachment portions is provided with a substantially cylindrical through-hole for connection to the vehicle body or the knuckle. At least one of the pair of attachment portions is provided with an annular reinforcing member for reinforcing around the through-hole.

With the reinforcing structure of the suspension arm according to the first aspect of the present invention, since at least one of the pair of attachment portions is provided with the annular reinforcing member for reinforcing around the through-hole, high rigidity capable of withstanding any input from the road surface or the like can be given to the suspension arm.

A method of manufacturing a suspension arm according to a ninth aspect of the present invention is premised on a vehicle suspension including a plurality of suspension arms, one ends of which being connected to a vehicle body of a vehicle and the other ends of which being connected to a knuckle. At least one of the suspension arms includes a main body and a pair of attachment portions provided at both ends of the main body. Each of the pair of attachment portions is provided with a substantially cylindrical through-hole for connection to the vehicle body or the knuckle. The through-hole is formed by performing a burring process on the pair of attachment portions. The suspension arm is manufactured by bonding via an adhesive an annular reinforcing member to at least one of the pair of attachment portions so as to surround and reinforce the through-hole.

With the method of manufacturing the suspension arm according to the ninth aspect of the present invention, the suspension arm is manufactured by bonding via an adhesive an annular reinforcing member to at least one of the pair of attachment portions so as to surround and reinforce the through-hole formed by the burring process, and thus it is possible to obtain the suspension arm having high rigidity capable of withstanding any input from the road surface or the like.

Advantageous Effects of Invention

According to the present invention, high rigidity capable of withstanding any input from the road surface or the like can be given to the suspension arm.

DESCRIPTION OF EMBODIMENTS

Hereinafter, a reinforcing structure of a suspension arm and a method of manufacturing the suspension arm according to an embodiment of the present invention will be described with reference to the drawings. In the drawings shown later, in principle, the same reference numerals are denoted to members having the same functions or members having functions corresponding to each other. For convenience of description, a size and shape of the member may be schematically represented by being deformed or exaggerated.

[Structure of Vehicle Suspension]

Figure 1:
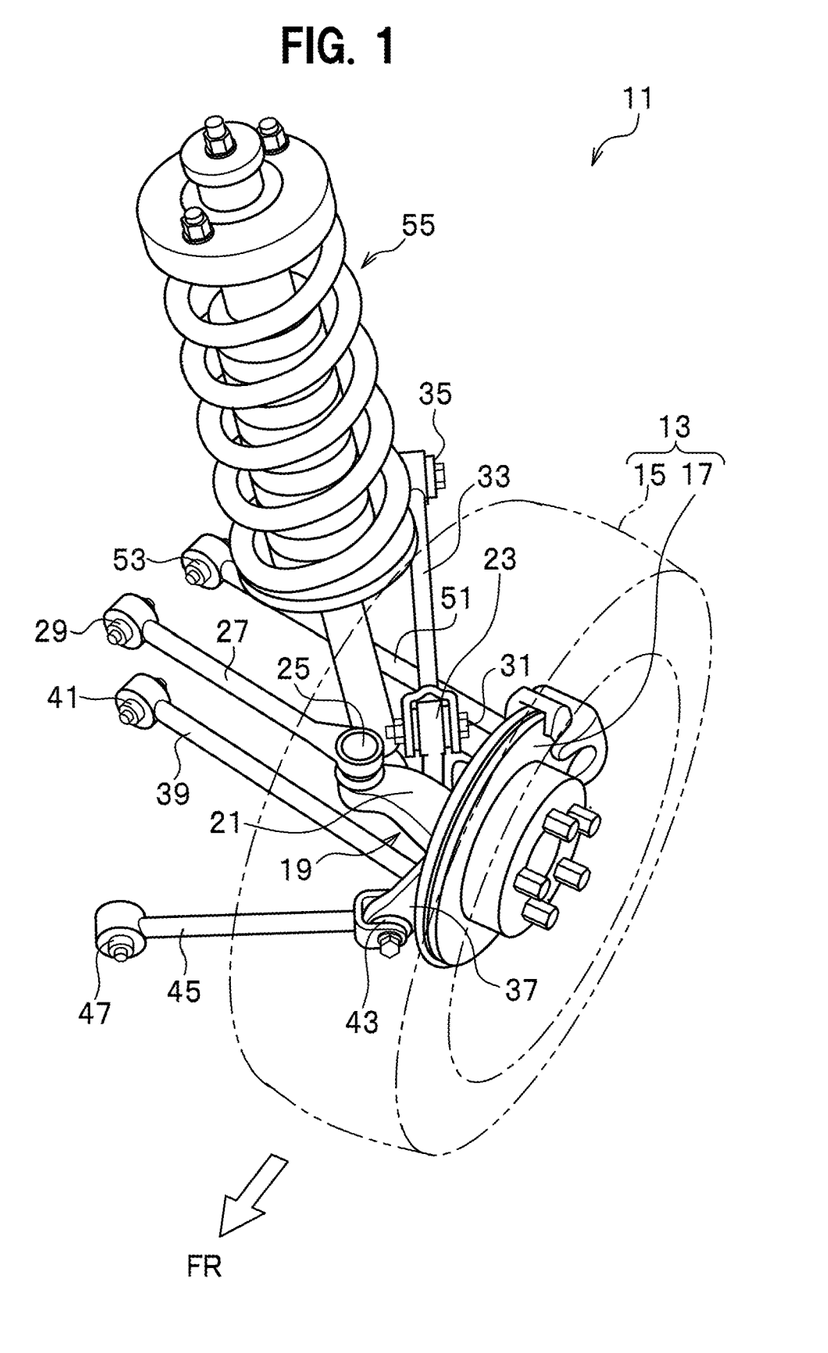
FIG. 1 is a transparent perspective view showing a main portion of a multi-link vehicle suspension.

First, a structure of a vehicle suspension to which the reinforcing structure of the suspension arm according to the embodiment of the present invention is applied will be described with reference to FIG. 1. FIG. 1 is a transparent perspective view showing a main portion of a multi-link vehicle suspension.

As shown in FIG. 1, a vehicle suspension 11 is a multi-link rear suspension provided on a left rear wheel 13 of a front wheel drive vehicle. The wheel 13 includes a tire 15, a wheel (not shown) and a brake disc 17. The wheel 13 is rotatably supported by a metal knuckle 19 via an axle (not shown).

As shown in FIG. 1, an upper arm mounting portion 21 extending upwardly from the knuckle 19 and a leading arm mounting portion 23 are formed integrally with the knuckle 19.

One end of an upper arm 27 is connected to the upper arm mounting portion 21 via a ball joint 25. The other end of the upper arm 27 is connected to a vehicle body (not shown) via a rubber bush joint 29.

One end of a leading arm 33 is connected to the leading arm mounting portion 23 via a rubber bush joint 31. The other end of the leading arm 33 is connected to the vehicle body via a rubber bush joint 35.

The upper arm 27 and the leading arm 33 are arranged to be located in substantially the same horizontal plane above the axle. The upper arm 27 extends in a vehicle width direction, while the leading arm 33 extends from a rear inner side of the vehicle body to a front outer side of the vehicle body.

As shown in FIG. 1, a lower arm mounting portion (not shown) extending downwardly from the knuckle 19 and a trailing arm mounting portion 37 are formed integrally with the knuckle 19.

One end of a lower arm 39 is connected to the lower arm mounting portion via a rubber bush joint (not shown). The other end of the lower arm 39 is connected to the vehicle body via a rubber bush joint 41.

One end of a trailing arm 45 is connected to the trailing arm mounting portion 37 via a rubber bush joint 43. The other end of the trailing arm 45 is connected to the vehicle body via a rubber bush joint 47.

The lower arm 39 and the trailing arm 45 are arranged to be located in substantially the same horizontal plane below the axle. The lower arm 39 extends in the vehicle width direction, while the trailing arm 45 extends from a front inner side of the vehicle body to a rear outer side of the vehicle body.

A control arm mounting portion (not shown) extending rearward of the vehicle body is formed integrally with the knuckle 19. One end of a control arm 51 is connected to the control arm mounting portion via a rubber bush joint (not shown). The other end of the control arm 51 is connected to the vehicle body via a rubber bush joint 53. The control arm 51 is provided to extend in the vehicle width direction at an intermediate height between the upper arm 27 and the lower arm 39.

A damper mounting portion (not shown) extending inward of the vehicle body from the knuckle 19 is formed integrally with the knuckle 19. A lower end of a damper 55 supporting the vehicle body at an upper end thereof is connected to the damper mounting portion.

[Reinforcing Structure of Suspension Arm According to First Embodiment of the Present Invention]

Figure 2:
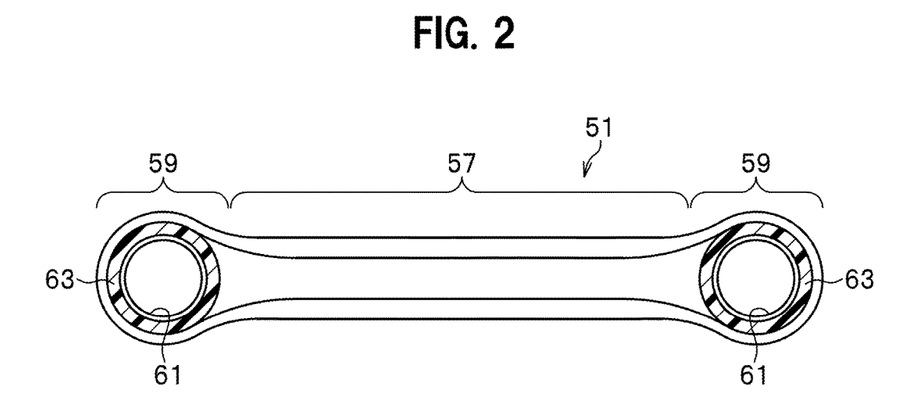
FIG. 2 is a front view of a reinforcing structure of a suspension arm according to a first embodiment of the present invention.
Figure 3:
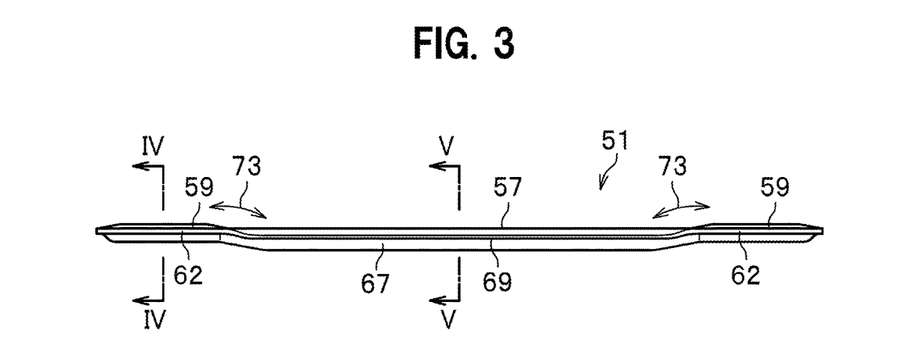
FIG. 3 is a side view of the suspension arm according to the first embodiment of the present invention.
Figure 4:
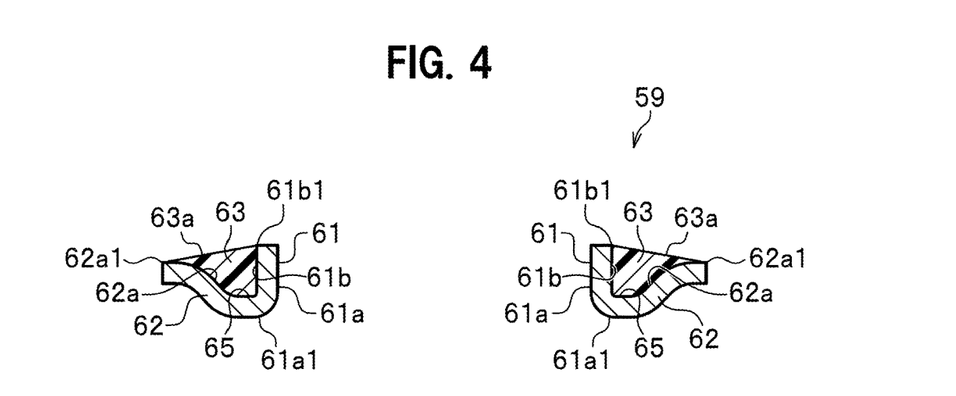
FIG. 4 is an end view taken along a line IV-IV in FIG. 3.
Figure 5:
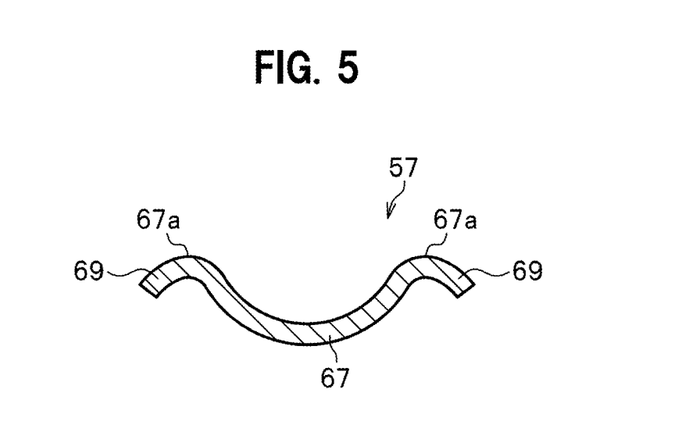
FIG. 5 is an end view taken along a line V-V in FIG. 3.
Figure 6:
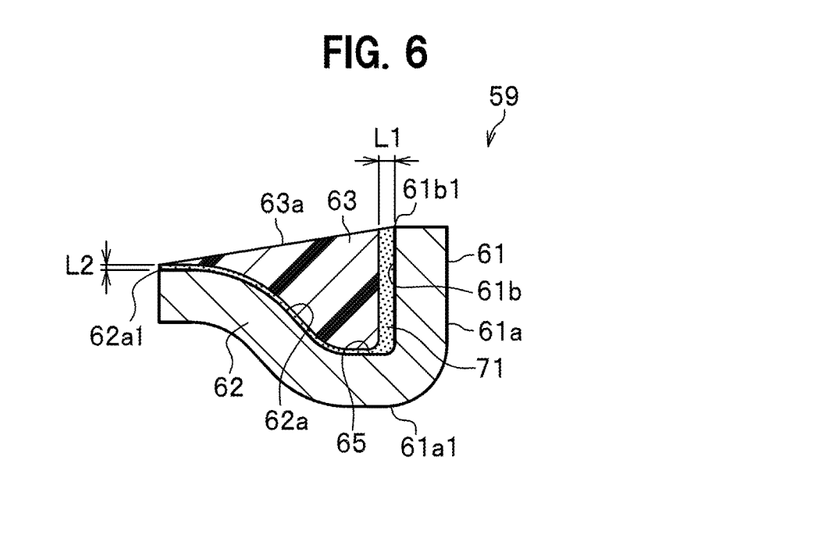
FIG. 6 is an enlarged view of a main portion of an end surface shown in FIG. 4.

Next, a reinforcing structure of a suspension arm according to a first embodiment of the present invention will be described with reference to FIGS. 2 to 6 by exemplifying the control arm 51 as the suspension arm. FIG. 2 is a front view of the reinforcing structure of the suspension arm according to the first embodiment of the present invention. FIG. 3 is a side view of the suspension arm according to the first embodiment of the present invention. FIG. 4 is an end view taken along a line IV-IV in FIG. 3. FIG. 5 is an end view taken along a line V-V in FIG. 3. FIG. 6 is an enlarged view of a main portion of an end surface shown in FIG. 4.

As shown in FIGS. 2 and 3, the control arm 51 includes a main body 57 extending substantially linearly and a pair of attachment portions 59 provided at both ends of the main body 57. As shown in FIG. 2, the pair of attachment portions 59 is formed in a substantially annular shape in front view. Specifically, as shown in FIG. 4, each of the pair of attachment portions 59 is provided with a through-hole 61 for connection to the vehicle body or the control arm mounting portion of the knuckle 19. The through-hole 61 has a substantially cylindrical inner peripheral wall 61a. The rubber bush joint 53 having a substantially columnar outer peripheral wall (not shown) is press-fitted and fixed into the through-hole 61.

Each of the pair of attachment portions 59 is provided with a substantially annular reinforcing member 63 for reinforcing around the through-hole 61. Although materials of the reinforcing member 63 are not particularly limited, for example, light weight and high hardness fiber reinforced resin materials such as fiber-reinforced plastic FRP and carbon fiber-reinforced plastic CFRP are preferably used.

As shown in FIG. 4, each of the pair of attachment portions 59 is provided with a first folded-back portion 62 rising from a lower end portion 61a1 of the inner peripheral wall 61a in the through-hole 61 as a starting point and extending outwardly. The through-hole 61 has a substantially cylindrical outer peripheral wall 61b on a back surface side of the inner peripheral wall portion 61a.

As shown in FIG. 5, the main body portion 57 extending substantially linearly includes a trough-shaped portion 67 formed in a downward convex shape. Further, the main body 57 is provided with a second folded-back portion 69 extending downwardly and outwardly from an upper end 67a of the trough-shaped portion 67 as a starting point.

As shown in FIGS. 4 and 6, each of the pair of attachment portions 59 includes a region 65 defined by the outer peripheral wall 61b of the through-hole 61 and an upper wall 62a of the first folded-back portion 62 and having a substantially trapezoidal cross-section. The annular reinforcing member 63 is provided to fill the substantially trapezoidal region 65. As shown in FIGS. 4 and 6, the annular reinforcing member 63 has an upper end surface 63a positioned on a line linearly connecting an upper end portion 61b1 of the outer peripheral wall 61b of the through-hole 61 and an outer peripheral edge 62a1 of the upper wall 62a of the first folded-back portion 62.

As shown in FIG. 6, the annular reinforcing member 63 is bonded to the outer peripheral wall 61b of the through-hole 61 and the upper wall 62a of the first folded-back portion 62 via an adhesive 71 applied in layers to the region 65 having a substantially trapezoidal cross-section.

It is assumed that a bowing force (bending force, prying force) related to compression or tension shown by an arrow 73 in FIG. 3 is applied to the control arm 51. At this time, a peel force is applied to the outer peripheral wall 61b of the through-hole 61. The outer peripheral wall 61b of the through-hole 61 corresponds to a "peel force acting portion" of an aspect of the present invention. Meanwhile, a shear force is applied to the upper wall 62a of the first folded-back portion 62. The upper wall 62a of the first folded-back portion 62 corresponds to a "shear force acting portion" of the aspect of the present invention.

Even when the peel force or the shear force is applied to the control arm 51, in order to maintain adhesive force of the adhesive 71 to the outer wall 61b of the through hole 61 or the upper wall 62a of the first folded portion 62, a layer thickness L1 of the adhesive 71 existing in a gap between the outer peripheral wall 61b of the through-hole 61 and the reinforcing member 63 is set larger than a layer thickness L2 of the adhesive 71 existing in a gap between the upper wall 62a of the first folded-back portion 62 and the reinforcing member 63. This is based on the finding that when the shear force is dominant, the layer thickness of the adhesive 71 is preferably small, whereas when the peel force is dominant, the layer thickness of the adhesive 71 is preferably large.

With the reinforcing structure of the suspension arm (control arm 51) according to the first embodiment of the present invention, since each of the pair of attachment portions 59 is provided with the annular reinforcing member 63 for reinforcing around the through-hole 61, high rigidity capable of withstanding any input from the road surface or the like can be given to the suspension arm (control arm 51).

[Reinforcing Structure of Suspension Arm According to Second Embodiment of the Present Invention]

Figure 7:
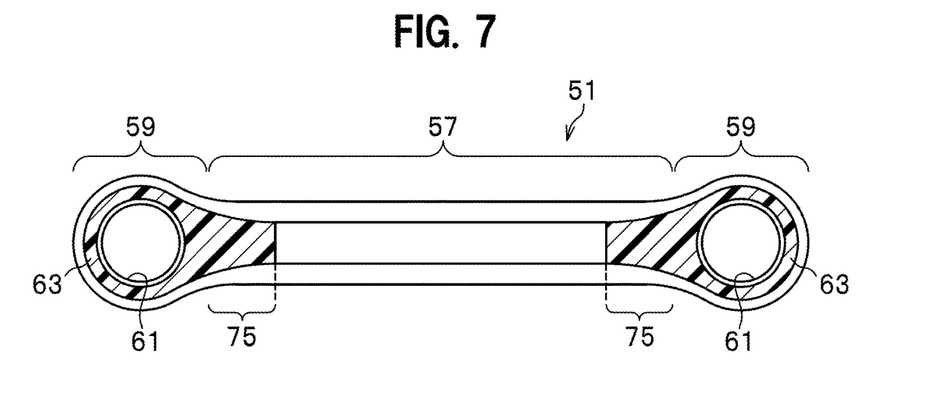
FIG. 7 is a front view of a reinforcing structure of a suspension arm according to a second embodiment of the present invention.

Next, a reinforcing structure of a suspension arm according to a second embodiment of the present invention will be described with reference to FIG. 7. FIG. 7 is a front view of the reinforcing structure of the suspension arm according to the second embodiment of the present invention.

The reinforcing structure of the suspension arm according to the first embodiment and the reinforcing structure of the suspension arm according to the second embodiment of the present invention differ only in a part of structure of the reinforcement member 63, and other structures are the same with each other. Therefore, the reinforcing structure of the suspension arm according to the second embodiment of the present invention will be described while focusing on differences between the above two embodiments.

As shown in FIG. 2, in the reinforcing structure of the suspension arm according to the first embodiment, each of the reinforcing members 63 has an annular portion in front view in order to reinforce around the through-hole 61 provided in each of the pair of attachment portions 59. In contrast, as shown in FIG. 7, the reinforcing structure of the suspension arm according to the second embodiment of the present invention is different from the reinforcing structure of the suspension arm according to the first embodiment in that each of the reinforcing members 63 has an extending portion 75 integrally continuous with the annular portion in front view and extending to the main body 57.

A length of the extending portion 75 in a longitudinal direction of the main body 57 may be appropriately set based on required rigidity requirements and the like. The extending portion 75 of the reinforcing member 63 is bonded to the main body 57 via the adhesive 71 applied in layers. The layer thickness of the adhesive 71 in the extending portion 75 is appropriately set based on a type of force (shear force or peel force) mainly applied to the extending portion 75 with reference to the above-described finding concerning an appropriate layer thickness of the adhesive 71.

With the reinforcing structure of the suspension arm (control arm 51) according to the second embodiment of the present invention, since each of the reinforcing members 63 has the extending portion 75 integrally continuous with the annular portion in front view and extending to the main body 57, higher rigidity capable of withstanding any input from the road surface or the like can be given to the suspension arm (control arm 51).

[Reinforcing Structure of Suspension Arm According to Third Embodiment of the Present Invention]

Figure 8:
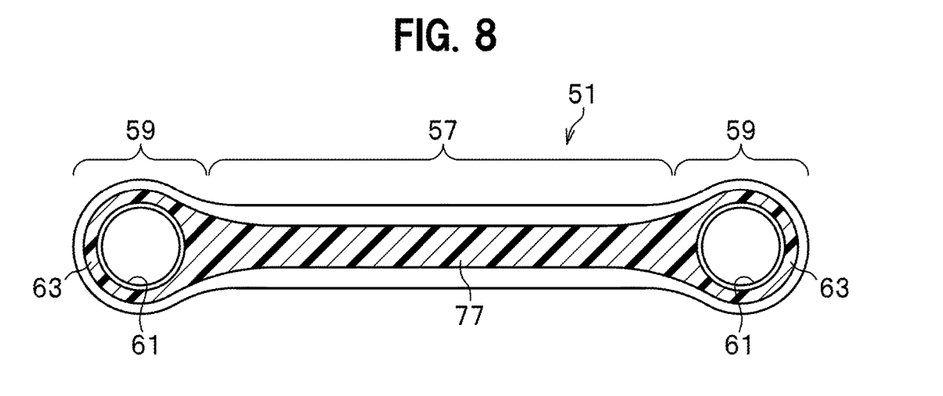
FIG. 8 is a front view of a reinforcing structure of a suspension arm according to a third embodiment of the present invention.
Figure 9:
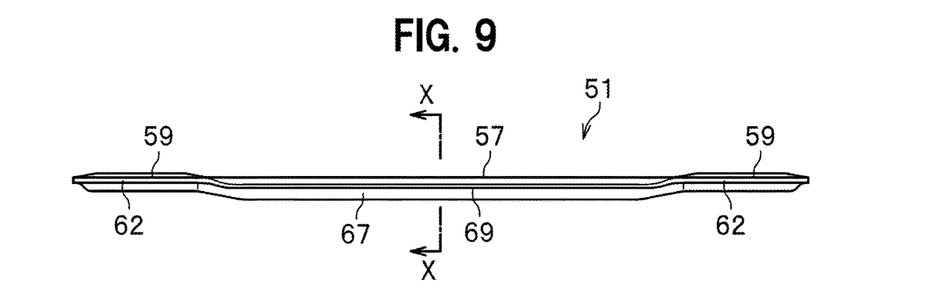
FIG. 9 is a side view of the suspension arm according to the third embodiment of the present invention.
Figure 10:
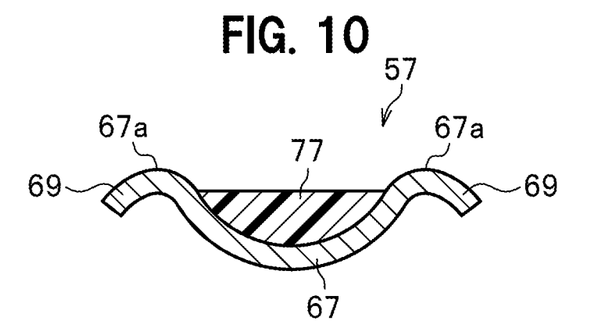
FIG. 10 is an end view taken along a line X-X in FIG. 9.

Next, a reinforcing structure of a suspension arm according to a third embodiment of the present invention will be described with reference to FIGS. 8 to 10. FIG. 8 is a front view of the reinforcing structure of the suspension arm according to the third embodiment of the present invention. FIG. 9 is a side view of the suspension arm according to the third embodiment of the present invention. FIG. 10 is an end view taken along a line X-X in FIG. 9.

The reinforcing structure of the suspension arm according to the second embodiment and the reinforcing structure of the suspension arm according to the third embodiment of the present invention differ only in a part of structure of the reinforcement member 63, and other structures are the same with each other. Therefore, the reinforcing structure of the suspension arm according to the third embodiment of the present invention will be described while focusing on differences between the above two embodiments.

As shown in FIG. 7, in the reinforcing structure of the suspension arm according to the second embodiment, each of the reinforcing members 63 has the extending portion 75 integrally continuous with the annular portion in front view according to the first embodiment and extending to the main body 57. In contrast, as shown in FIGS. 8 to 10, the reinforcing structure of the suspension arm according to the third embodiment of the present invention is different from the reinforcing structure of the suspension arm according to the second embodiment in that the reinforcing member 63 has a bridging portion 77 bridging the annular portions in front view respectively provided in the pair of attachment portions 59. The bridging portion 77 of the reinforcing member 63 is provided to extend along the trough-shaped portion 67 of the main body 57 in the longitudinal direction thereof. An amount (a length in a height direction of a cross-section shown in FIG. 10) of the reinforcing member 63 embedded in the trough-shaped portion 67 is appropriately set based on the required rigidity requirements and the like.

The bridging portion 77 of the reinforcing member 63 is bonded to the main body 57 via the adhesive 71 applied in layers. The layer thickness of the adhesive 71 in the bridging portion 77 is appropriately set based on the type of force (shear force or peel force) mainly applied to the bridging portion 77 with reference to the above-described finding concerning an appropriate layer thickness of the adhesive 71.

With the reinforcing structure of the suspension arm (control arm 51) according to the third embodiment of the present invention, since the reinforcing member 63 has the bridging portion 77 bridging the annular portions in front view respectively provided in the pair of attachment portions 59, even higher rigidity capable of withstanding any input from the road surface or the like can be given to the suspension arm (control arm 51).

<Method of Manufacturing Suspension Arm According to Embodiment of the Present Invention>

Next, a method of manufacturing a suspension arm according to an embodiment of the present invention will be described with reference to FIGS. 2, 4 and 6 by exemplifying the control arm 51 as the suspension arm.

In the method of manufacturing the suspension arm according to the embodiment of the present invention, as shown in FIGS. 2, 4, and 6, the through-hole 61, which is provided in each of the pair of attachment portions 59 and has the substantially cylindrical inner peripheral wall 61a, is formed by performing a burring process on the pair of attachment portions 59 having a substantially circular shape in front view. The suspension arm (control arm 51) is manufactured by bonding via the adhesive 71 the annular reinforcing member 63 to each of the pair of attachment portions 59 so as to surround and reinforce the through-hole 61.

Recently, high tensile steel has been widely used as a material for the suspension arm (control arm 51). The high tensile steel means a steel material having improved strength (rigidity) as compared with a steel material for a general structure, for example, by adding an alloy component to the steel material, or controlling structure of the steel material. It is assumed that the high tensile steel is used as a work of the suspension arm (control arm 51), and the burring process is performed on the work. The high tensile steel does not have good processability. Therefore, when the through-hole 61 having the substantially cylindrical inner peripheral wall 61a is formed by the burring process, there arises a problem that a height dimension of the inner peripheral wall 61a (dimension in a vertical direction on a page of FIG. 6) is not sufficiently increased and rigidity of the attachment portion 59 to which the rubber bush joint is press-fitted and fixed is not sufficient. In addition, in formation of the attachment portion 59 by the burring process, the rigidity tends to be insufficient in the first place. Therefore, some measures have been required for improving the rigidity of the attachment portion 59.

In the method of manufacturing the suspension arm according to the embodiment of the present invention, the through-hole 61 is formed by performing the burring process on the pair of attachment portions 59, and the suspension arm (control arm 51) is manufactured by bonding via the adhesive 71 the annular reinforcing member 63 to each of the pair of attachment portions 59 so as to surround and reinforce the through-hole 61.

With the method of manufacturing the suspension arm according to the embodiment of the present invention, even in the formation of the attachment portion 59 by the burring process, it is possible to obtain a suspension arm having high rigidity capable of withstanding any input from the road surface or the like.

[Operational Effects of the Present Invention]

Next, operational effects of the present invention will be described. The reinforcing structure of the suspension arm according to a first aspect of the present invention is premised on the vehicle suspension 11 including a plurality of suspension arms 27, 33, 39, 45, 51, one ends of which being connected to the vehicle body, and the knuckle 19 to which the other ends of the plurality of suspension arms 27, 33, 39, 45, 51 being connected. The suspension arm (control arm 51) includes the main body 57 and the pair of attachment portions 59 provided at both ends of the main body 57. Each of the pair of attachment portions 59 is provided with a substantially cylindrical through-hole 61 for connection to the vehicle body or the knuckle 19. At least one of the pair of attachment portions 59 is provided with the annular reinforcing member 63 for reinforcing around the through-hole 61.

With the reinforcing structure of the suspension arm according to the first aspect of the present invention, since at least one of the pair of attachment portions 59 is provided with the annular reinforcing member 63 for reinforcing around the through-hole 61, high rigidity capable of withstanding any input from the road surface or the like can be given to the suspension arm.

In the reinforcing structure of the suspension arm according to a second aspect of the present invention, the reinforcing member 63 may be made of a fiber reinforced resin material.

With the reinforcing structure of the suspension arm according to the second aspect of the present invention, since the reinforcing member 63 is made of a light weight and high rigidity fiber reinforced resin material, higher rigidity capable of withstanding any input from the road surface or the like can be given to the suspension arm.

In the reinforcing structure of the suspension arm according to a third aspect of the present invention, the reinforcing member 63 may be bonded to at least one of the pair of attachment portions 59 via the adhesive 71 so as to surround the substantially cylindrical through-hole 61.

With the reinforcing structure of the suspension arm according to the third aspect of the present invention, since the reinforcing member 63 is bonded to at least one of the pair of attachment portions 59 via the adhesive 71 so as to surround the substantially cylindrical through-hole 61, higher rigidity capable of withstanding any input from the road surface or the like can be given to the suspension arm by using the adhesive 71 having a strong adhesive force.

In the reinforcing structure of the suspension arm according to a fourth aspect of the present invention, the suspension arm may be the control arm 51 provided in the multi-link vehicle suspension.

With the reinforcing structure of the suspension arm according to the fourth aspect of the present invention, since the suspension arm is the control arm 51 provided in the multi-link vehicle suspension, it is possible to smoothly perform toe-in control during turning and to increase camber rigidity, toe rigidity and SAT (self aligning torque: restoring force trying to return a steering wheel to a straight traveling state) rigidity.

In the reinforcing structure of the suspension arm according to a fifth aspect of the present invention, the reinforcing member 63 may be provided in one of the pair of attachment portions 59, the one being closer to a brake system (the brake disc 17) provided in the vehicle.

With the reinforcing structure of the suspension arm according to the fifth aspect of the present invention, since the reinforcing member 63 is provided in one of the pair of attachment portions 59, the one being closer to the brake system (brake disc 17) provided in the vehicle, for example when using carbon fiber reinforced plastic CFRP having characteristics that thermal expansion hardly occurs as the reinforcing member 63, it is possible to suppress influence on driving performance related to expansion and contraction of the suspension arm due to the thermal expansion.

In the reinforcing structure of the suspension arm according to a sixth aspect of the present invention, the reinforcing member 63 may be provided in each of the pair of attachment portions 59 and be provided to extend from each of the pair of attachment portions 59 to the main body 57 (for example, see FIG. 7).

With the reinforcing structure of the suspension arm according to the sixth aspect of the present invention, since the reinforcing member 63 is provided in each of the pair of attachment portions 59 and is provided to extend from each of the pair of attachment portions 59 to the main body 57, higher rigidity capable of withstanding any input from the road surface or the like can be given to the suspension arm.

In the reinforcing structure of the suspension arm according to a seventh aspect of the present invention, the reinforcing member 63 may be provided in each of the pair of attachment portions 59 and be also provided in the main body 57 so as to bridge between the pair of attachment portions 59 (for example, see FIG. 8).

With the reinforcing structure of the suspension arm according to the seventh aspect of the present invention, since the reinforcing member 63 is provided in each of the pair of attachment portions 59 and is also provided in the main body 57 so as to bridge between the pair of attachment portions 59, even higher rigidity capable of withstanding any input from the road surface or the like can be given to the suspension arm.

In the reinforcing structure of the suspension arm according to an eighth aspect of the present invention, the reinforcing member 63 includes the shear force acting portion (upper wall 62*a* of the first folded-back portion 62) to which the shear force is applied, and the peel force acting portion (outer peripheral wall 61*b* of the through-hole 61) to which the peel force is applied, when a compression or tension force is applied to the suspension arm. The layer thickness L1 (see FIG. 6) of the adhesive 71 at the peel force acting portion is set larger than the layer thickness L2 (see FIG. 6) of the adhesive 71 at the shear force acting portion.

With the reinforcing structure of the suspension arm according to the eighth aspect of the present invention, since the layer thickness L1 of the adhesive 71 at the peel force acting portion is set larger than the layer thickness L2 of the adhesive 71 at the shear force acting portion, even when the peel force or the shear force is applied to the reinforcing structure, the adhesive force of the adhesive 71 to the outer wall 61*b* of the through-hole 61 or the upper wall 62*a* of the first folded-back portion 62 can be maintained as much as possible.

In the method of manufacturing the suspension arm according to a ninth aspect of the present invention, the through-hole 61 is formed by performing the burring process on the pair of attachment portions 59, and the suspension arm is manufactured by bonding via the adhesive 71 the annular reinforcing member 63 to at least one of the pair of attachment portions 59 so as to surround and reinforce the through-hole 61.

With the method of manufacturing the suspension arm according to the ninth aspect of the present invention, even in the formation of the attachment 59 by the burring process, it is possible to obtain the suspension arm having high rigidity capable of withstanding any input from the road surface or the like.

[Other Embodiments]

The above-described embodiment shows an example of embodying the present invention. Therefore, technical scope of the present invention should not be interpreted restrictively by the embodiment. This is because the present invention can be implemented in various forms without departing from the scope or main features thereof.

For example, in description of the reinforcing structure of the suspension arm according to the embodiments of the present invention, although the reinforcing member 63 is provided in each of the pair of attachment portions 59, the present invention is not limited to this example. The reinforcing member 63 may be provided in either one of the pair of mounting portions 59.

In the description of the embodiments of the present invention, although the present invention is applied to the control arm among the plurality of suspension arms, the present invention is not limited to this example. The present invention may be applied to one or more arbitrary suspension arms among the plurality of suspension arms.

Further, in the description of the embodiments of the present invention, although the present invention is applied to the suspension arm of the multi-link suspension, the present invention is not limited to this example. The present invention may be applied to, for example, the suspension arm of a double wishbone suspension.

REFERENCE SIGNS LIST

17: brake disc (brake system)
19: knuckle
27: upper arm (suspension arms)
33: leading arm (suspension arms)
39: lower arm (suspension arms)
45: trailing arm (suspension arms)
51: control arm (suspension arms)
57: main body
59: pair of attachment portions
61: through-hole
63: reinforcing member
71: adhesive

The invention claimed is:

1. A reinforcing structure of a suspension arm in a vehicle suspension comprising a plurality of suspension arms, one ends of which being connected to a vehicle body of a vehicle and the other ends of which being connected to a knuckle, wherein
    at least one of the suspension arms comprises a main body and a pair of attachment portions provided at both ends of the main body,
    each of the pair of attachment portions is provided with a substantially cylindrical through-hole for connection to the vehicle body or the knuckle,
    at least one of the pair of attachment portions is provided with an annular reinforcing member for reinforcing around the through-hole,
    the reinforcing member is bonded to at least one of the pair of attachment portions via an adhesive so as to surround the substantially cylindrical through-hole,
    the reinforcing member comprises a shear force acting portion to which a shear force is applied, and a peel force acting portion to which a peel force is applied, when a compression or tension force is applied to the suspension arm, and
    a layer thickness of the adhesive at the peel force acting portion is set larger than that of the adhesive at the shear force acting portion.

2. The reinforcing structure of the suspension arm according to claim 1, wherein the reinforcing member is made of a fiber reinforced resin material.

3. The reinforcing structure of the suspension arm according to claim 2, wherein the suspension arm is a control arm provided in a multi-link vehicle suspension.

4. The reinforcing structure of the suspension arm according to claim 2, wherein the reinforcing member is provided in one of the pair of attachment portions, the one being closer to a brake system provided in the vehicle.

5. The reinforcing structure of the suspension arm according to claim 2, wherein the reinforcing member is provided in each of the pair of attachment portions and is provided to extend from each of the pair of attachment portions to the main body.

6. The reinforcing structure of the suspension arm according to claim 2, wherein the reinforcing member is provided in each of the pair of attachment portions and is also provided in the main body so as to bridge between the pair of attachment portions.

7. The reinforcing structure of the suspension arm according to claim 1, wherein the suspension arm is a control arm provided in a multi-link vehicle suspension.

8. The reinforcing structure of the suspension arm according to claim 1, wherein the reinforcing member is provided in one of the pair of attachment portions, the one being closer to a brake system provided in the vehicle.

9. The reinforcing structure of the suspension arm according to claim 1, wherein the reinforcing member is provided in each of the pair of attachment portions and is provided to extend from each of the pair of attachment portions to the main body.

10. The reinforcing structure of the suspension arm according to claim 1, wherein the reinforcing member is provided in each of the pair of attachment portions and is also provided in the main body so as to bridge between the pair of attachment portions.

* * * * *